United States Patent [19]

Miller et al.

[11] Patent Number: 5,719,209
[45] Date of Patent: Feb. 17, 1998

[54] TETRAFLUOROETHYLENE POLYMER COMPOSITIONS AND PROCESS FOR MAKING FLAME RETARDANT THERMOPLASTIC COMPOSITIONS UTILIZING THE SAME

[75] Inventors: Ronald R. Miller, Washington; Yoke Kum Fong, Parkersburg; Roger D. Amos, Washington, all of W. Va.

[73] Assignee: General Electric Company, Pittsfield, Mass.

[21] Appl. No.: 324,829

[22] Filed: Oct. 18, 1994

[51] Int. Cl.$^6$ .............................. C08K 5/523; C08K 5/12
[52] U.S. Cl. .................. 523/351; 524/141; 524/318; 524/399; 524/410; 524/411; 524/546
[58] Field of Search ........................... 523/351; 524/410, 524/411, 141, 546, 399, 318

[56] References Cited

U.S. PATENT DOCUMENTS

| | | | |
|---|---|---|---|
| 3,591,546 | 7/1971 | Chritmas et al. | 524/318 |
| 3,953,412 | 4/1976 | Saito et al. | 524/546 |
| 4,355,126 | 10/1982 | Haaf et al. | 524/411 |
| 4,639,486 | 1/1987 | Liu . | |
| 4,746,573 | 5/1988 | Arcella et al. | 524/400 |
| 4,767,821 | 8/1988 | Lindner et al. | 525/72 |
| 4,829,116 | 5/1989 | Piesold | 524/278 |
| 5,070,129 | 12/1991 | Bailey | 524/546 |
| 5,281,648 | 1/1994 | Doucet et al. | 524/411 |

FOREIGN PATENT DOCUMENTS

| | | |
|---|---|---|
| A-0002514 | 9/1978 | European Pat. Off. . |
| A-0490217 | 7/1991 | European Pat. Off. . |
| A-0527493 | 11/1993 | European Pat. Off. . |
| 55-155041 | 12/1980 | Japan . |
| 62-253434 | 11/1987 | Japan . |
| 2-92947 | 4/1990 | Japan . |

*Primary Examiner*—Veronica P. Hoke

[57] ABSTRACT

A process is provided for making a flame retardant thermoplastic composition. The process involves making a preblend composition by blending a lubricant with a tetrafluoroethylene polymer. The preblend is a shelf stable tetrafluoroethylene polymer composition which can be admixed with a thermoplastic and a flame retardant to make the flame retardant thermoplastic composition which are useful to make molded components for computer housings, keyboard housings, printer housings and power tool housings.

6 Claims, No Drawings

TETRAFLUOROETHYLENE POLYMER COMPOSITIONS AND PROCESS FOR MAKING FLAME RETARDANT THERMOPLASTIC COMPOSITIONS UTILIZING THE SAME

BACKGROUND OF THE INVENTION

1. Field of the Invention

The present invention relates to thermoplastic compositions and processes, and more particularly relates to tetrafluoroethylene compositions; and process for making thereof.

2. Description of the Related Art

Polytetrafluoroethylene polymers and their use as drip suppressants in flame retardant thermoplastic compositions are generally known, see Liu, U.S. Pat. No. 4,639,486, issued Jan. 27, 1987, which is incorporated herein by reference. Vinyl aromatic thermoplastic compositions utilizing such polytetrafluoroethylene (PTFE) polymers, however, have typically suffered from one or more of the following problems (a) less than desired levels of impact strength or (b) fibrillization of the PTFE material resulting in the PTFE being undesirably visible at the surface of molded parts resulting in poor surface appearance. Additionally, the PTFE materials have typically required storing in cool and dry conditions in order to maximize shelf life and minimize problems associated with the PTFE materials sensitivity to compaction and moisture at ambient temperature.

Accordingly, there is a need to provide a process for making a vinyl aromatic thermoplastic composition utilizing a polytetrafluoroethylene polymer which exhibits improved impact strength, no detectable fibrillized PTFE and good molded surfaces; and there is a need to provide PTFE compositions exhibiting enhanced shelf life without refrigeration.

SUMMARY OF THE INVENTION

The process of the present invention involves making a flame retardant thermoplastic composition by blending (a) a lubricant and (b) a tetrafluoroethylene polymer to form a shelf stable preblend composition. The preblend may then be admixed with a thermoplastic resin and a flame retardant to produce the thermoplastic resin composition. The thermoplastic resin composition is useful for making molded components such as parts for computer housings, printer housings, keyboard housings and power tool housings.

DETAILED DESCRIPTION OF THE INVENTION

The process for making a flame retardant thermoplastic composition involves (a) blending (i) a lubricant and (ii) a tetrafluoroethylene polymer to form a shelf stable tetrafluoroethylene polymer preblend composition, and then (b) admixing the preblend with a thermoplastic resin and a flame retardant to form the flame retardant thermoplastic composition. The blending step (a) is preferably done under low shear such as with a can type shaker for blending the ingredients. Alternatively, blending may be achieved by spraying a latex of tetrafluroethylene onto solid lubricant particles followed by drying of the material to produce a blend in the form of dry tetrafluoroethylene polymer coated lubricant particles.

The preblend composition preferably comprises the lubricant at a level of 10 to 95 percent by weight based on the total weight of the preblend composition, more preferably from 20 to 80 percent by weight thereof, and most preferably from 30 to 40 percent by weight thereof; the preblend preferably comprises the polytetrafluoroethylene at a level of from 0.01 to 50 weight percent based on the total weight of the preblend composition, and more preferably from 0.1 to 25 percent by weight thereof; and the preblend composition preferably comprises a vinyl aromatic resin at a level of from 0 to 90 percent by weight based on the total weight of the composition, more preferably from 1 to 90 percent by weight thereof, even more preferably from 20 to 80 percent by weight thereof, and most preferably from 50 to 70 percent by weight thereof.

The preblend is then admixed with a thermoplastic resin and a flame retardant to produce the flame retardant thermoplastic composition. The preblend and thermoplastic resin are preferably admixed in a respective weight ratio of between 1:1 and 1:100, more preferably between 1:5 and 1:40, and most preferably between 1:10 and 1:20.

The lubricant is preferably selected from waxes, metal salts of fatty acids and alkyl esters of fatty acids, and more preferably is a mixture of a metal salt of a fatty acid and an alkyl ester of a fatty acid. Suitable waxes include ethylenic polymers, polyalkylene ethers, and polyolether esters. Examples of suitable waxes include EBS wax, low molecular weight polyethylene oxide and propylene oxide. The lubricant may be in any suitable form initially, including powder, liquid, grill or flake.

The flame retardant thermoplastic composition preferably comprises the thermoplastic resin at a level of from 50 to 98 percent by weight based on the total weight of the thermoplastic composition, more preferably from 60 to 90 percent by weight thereof, and most preferably from 70 to 80 percent by weight thereof; the flame retardant thermoplastic resin composition preferably comprises the lubricant at a level of from 0.5 to 5 percent by weight based on the total weight of the flame retardant thermoplastic resin, more preferably from 0.02 to 1.0 percent by weight thereof. The flame retardant thermoplastic composition preferably comprises the flame retardant at a level of from 5 to 40 percent by weight based on the total weight of the composition, more preferably from 10 to 30 percent by weight thereof, and most preferably from 15 to 25 percent by weight thereof.

The thermoplastic resin preferably is a vinyl aromatic resin, and is more preferably rubber modified monovinylidene aromatic resin comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers. Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof.

Monovinylidene aromatic monomers (vinyl aromatic monomers) which may be employed include styrene, alphamethyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidene-aromatic monomers utilized are generically described by the following formula:

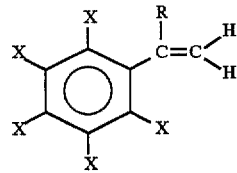

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth)acrylates, hydroxy alkyl (meth) acrylates or mixtures thereof. The acrylonitrile, substituted acrylonitrile, or acrylic acid esters are described generically by the following formula:

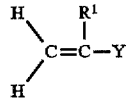

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, α-chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The rubber modified graft copolymer comprises (i) the rubber substrate, and (ii) a rigid polymeric superstrate portion grafted to the rubber substrate. The rubber substrate is preferably present in the graft copolymer at a level of from 5 to 85 percent by weight based on the total weight of the graft copolymer, more preferably from 10 to 80 percent by weight thereof, and most preferably 20 to 70 percent by weight thereof; and the rigid superstrate is preferably present at a level of from 15 to 95 percent by weight based on the total weight of the graft copolymer, more preferably from 20 to 90 percent by weight thereof, and most preferably from 30 to 80 percent by weight thereof.

For high rubber graft emulsion resins, the rubber level will range from 50 to 85% by weight based on the total weight of the rubber modified resin. For mass polymerization, the rubber level ranges from 4 to 40% by weight based on the total weight of the rubber modified resin. For blends of an ungrafted rigid copolymer (such as styrene-acrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth)acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methylmethacrylate or $C_1$–$C_6$-alkylacrylate which are produced by aqueous radical emulsion polymerisation. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycolbis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

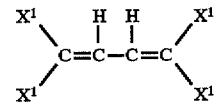

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of select one of the following: 0.05 to 1.2 microns, preferably 0.2 to 0.8 microns, for emulsion based polymerized rubber latices or 0.5 to 10 microns, preferably 0.6 to 1.5 microns, for mass polymerized rubber substrates which also have included grafted monomer occlusions. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and methylmethacrylate polymers or copolymers with up to 50% by weight of $C_1$–$C_6$ alkylacrylates, acrylonitrile or styrene. Specific examples of monovinylidene aromatic graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

The ungrafted rigid polymers (typically free of rubber) are resinous, thermoplastic polymers of styrene, α-methylstyrene, styrenes substituted in the nucleus such as p-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, α-methylstyrene/acrylonitrile copolymers and methylmethacrylate/acrylonitrile copolymers are preferred.

The ungrafted rigid copolymers are known and may be prepared by radical polymerisation, in particular by emulsion, suspension, solution or bulk polymerisation. They preferably have number average molecular weights of from 20,000 to 200,000.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40. The third monomer may optional replace 0 to 50% of one or both of the first and second monomers.

These rubber modified monovinylidene aromatic graft polymers may be polymerized either by mass, emulsion, suspension, solution or combined processes such as bulk-suspension, emulsion-bulk, bulk-solution or other techniques well known in the art. Furthermore, these rubber modified monovinylidene aromatic graft copolymers may be produced either by continuous, semibatch or batch processes.

The thermoplastic resin may also contain amounts of a second resin such as an aromatic polycarbonate resin, a polybutylene terephthalate resin or a polyphenylene ether resin. The vinyl aromatic resin may also be a polystyrene or a rubber modified polystyrene.

Tetrafluoroethylene polymers which are suitable according to the invention have fluorine contents of 65–76% by weight, preferably 70–76% by weight. Examples are polytetrafluoroethylene, tetrafluoroethylene/hexafluoropropylene copolymers and tetrafluoroethylene copolymers containing small amounts of fluorine-free copolymerisable ethylenically unsaturated monomers. Such polymers are known from "Vinyl and Related Polymers", John Wiley & Sons, Inc., New York, 1952, pages 484–494; "Fluorpolymers", Wiley-Interscience, New York, 1972; "Encyclopedia of Polymer Science and Technology", Interscience Publishers, New York, Volume 13, 1970, pages 623–654; "Modern Plastics Encyclopedia", 1970–1971, Volume 47, No. 10 A, October 1970 McGraw-Hill, Inc., New York, pages 134, 138 and 774; "Modern Plastics Encyclopedia", 1975–1976, October 1975, Volume 52, No. 10 A, McGraw-Hill, Inc., New York, pages 27, 28 and 472 and U.S. Pat. Nos. 3,671,487, 3,723,373 and 3,838,092. The tetrafluoroethylene polymers of the present invention are in powder or latex form.

The lubricant is preferably an alkyl ester of a fatty acid, a metal salt of a fatty acid, or a mixture thereof. Suitable alkyl esters of fatty acids include $C_1$ to $C_{18}$ alkyl esters of $C_4$ to $C_{22}$ fatty acids and may be generally represented by the formula

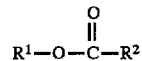

wherein $R^1$ is selected from $C_1$ to $C_{18}$ alkyl groups and $R^2$ is selected from $C_3$ to $C_{21}$ alkyl groups, and preferably $R^1$ is a $C_2$ to $C_8$ alkyl group and $R^2$ is a $C_{11}$ to $C_{17}$ alkyl group. More preferably $R^1$ is a butyl group and $R^2$ is a $C_{17}$ alkyl group such that the alkyl ester of a fatty acid is the butyl ester of stearic acid (butyl stearate). Suitably fatty acid portions include butyric, lauric, palmitic and stearic acids. The fatty acids may be saturated or unsaturated. Suitably unsaturated fatty acids include oleic, linoleic, and linolenic. Suitable metal salts of fatty acids include magnesium salts, calcium salts, zinc salts and titanium salts. The preferred salts are magnesium salts of fatty acids such as magnesium stearate. Suitable metal salts of fatty acids may be represented by the general formula

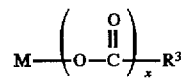

wherein x is the valance of the metal atom and $R^3$ is defined as $R^2$ above. Preferably M is magnesium or calcium. Preferably the lubricant is a mixture of a metal salt of a fatty acid and an alkyl ester of a fatty acid, wherein the lubricant composition preferably comprises the metal salt of a fatty acid at a level of from 60 to 95 percent by weight based on the total weight of the lubricant composition, more preferably from 70 to 90 percent by weight thereof, and most preferably from 60 to 95 percent by weight thereof; and preferably comprises the alkyl ester of a fatty acid at a level of from 5 to 40 percent by weight based on the total weight of the lubricant composition, more preferably from 10 to 30 percent by weight thereof, and most preferably from 15 to 25 percent by weight thereof.

The usual flameproofing additives, in particular low molecular weight bromine compounds, can be used as the organic halogen compounds. Examples are octabromodiphenyl ethers, tetrabromophthalimide, tribromophenoxymethane, bis(tribromophenoxy)ethane, tris(tribromophenyl) triphosphate, trichlorotetrabromotoluene, hexabromocyclododecane and decabromodiphenyl ether.

Mono or poly oligomer of tetrabromo BP-A either capped with tri to penta bromo phenol or uncapped are also suitable.

The flame retardant thermoplastic composition may contain various other components such as flame retardant synergists (enhancing agents) such as oxides and halides of groups IV-A and V-A of the periodic table; organic or inorganic compounds of phosphorous, nitrogen, boron or sulfur; and oxides and halides of, for example, zinc, magnesium and titanium, all as disclosed in U.S. Pat. No. 4,016,139. Preferred enhancing agents in accordance with this invention are the oxides of antimony, arsenic and bismuth, with the oxides of antimony being especially preferred. Suitable synergists include $Sb_2O_3$ (antimony trioxide), $Sb_2(CO_3)_3$, $Bi_2O_3$ and $Bi_2(CO_3)_3$, and may be present in various amounts such as 0 to 15% by weight based on the total weight of the flame retardant thermoplastic composition more preferably from 0.1 to 15%, even more preferably 2 to 10%, and most preferably 3 to 6 percent by weight thereof.

The scope of the present invention includes the incorporation of other additives in the composition so far as to produce a particular end result. Such additives include, without limitation, heat stabilizers, light stabilizers, plasticizers, pigments, preservatives, ultraviolet light stabilizers, fillers, antioxidants, antistatic agents and other materials well known to those skilled in the art, for example, as described in Modern Plastics Encyclopedia, Vol. 63, No. 10A, McGraw-Hill, Inc. (1986).

EXAMPLES

An example of a preblend composition and product properties are given below. As a comparison, the same product compounded without the preblend process is included.

| Preblend Composition | Weight % |
|---|---|
| Resin | 60.00 |
| Magnesium stearate | 30.00 |
| Butyl Stearate | 7.60 |
| Polytetrafluoroethylene | 0.76 |

| Molded Final Product Property | Ex 1 Preblend | CEX A Direct Addition |
|---|---|---|
| Gardner impact, ft-lb | 20 | Less than 10 |
| Polytetrafluoroethylene fiber/particulate | None detected visually | Detected visually |

The molded final product was made by admixing the preblend with an acrylonitrile-butadiene-styrene graft copolymer and a brominated flame retardant for Example 1 compared to a direct addition process as set out in comparative control example A. The preblend is made in a low shear process involving can shaking of the ingredients to achieve the blending. Optionally, an amount of the flame retardant may be included in the preblend.

The tetrafluoroethylene polymer powders are preferably in a number average particle size range of from 100 microns to 500 microns, and the tetrafluoroethylene polymer latex preferably has a number average particle size range of from 0.2 to 1 micron.

We claim:

1. A process for making a flame retardant thermoplastic composition, said process comprising:

(a) preparing a pre-blend by blending (i) a lubricant selected from the group consisting of metal salts of fatty acids and alkyl esters of fatty acids, (ii) a tetrafluoroethylene polymer powder, and a thermoplastic resin comprising a first vinyl aromatic polymer to form a preblend, said lubricant being present at a level of from 30 to 40 weight percent based on the total weight of the preblend and said tetrafluoroethylene polymer powder being present at a level of from 0.1 to 25 percent by weight based on the total weight of the preblend, (b) admixing said preblend with a thermoplastic resin comprising a second vinyl aromatic polymer and a flame retardant selected from the group consisting of phosphates and halogenated organic compounds, said preblend being present in a weight ratio of between 1:10 and 1:20 relative to the thermoplastic resin.

2. The process of claim 1 wherein said thermoplastic resin and said flame retardant are premixed.

3. The process of claim 1 wherein said thermoplastic resin is a vinyl cyanide-diene-vinyl aromatic graft copolymer.

4. The process of claim 1 wherein said lubricant comprises magnesium stearate.

5. The process of claim 1 wherein said lubricant comprises butyl stearate.

6. The process of claim 1 wherein said thermoplastic resin is a rubber modified monovinylidene aromatic graft copolymer comprising (a) a rubber modified monovinylidene aromatic graft copolymer and (b) an ungrafted rigid copolymer.

* * * * *